324-77 CROSS REFERENCE SEARCH ROOM
Nov. 17, 1970 J. H. WORTHEN 3,541,509
PROPERTY FILTERS
Filed Dec. 28, 1966
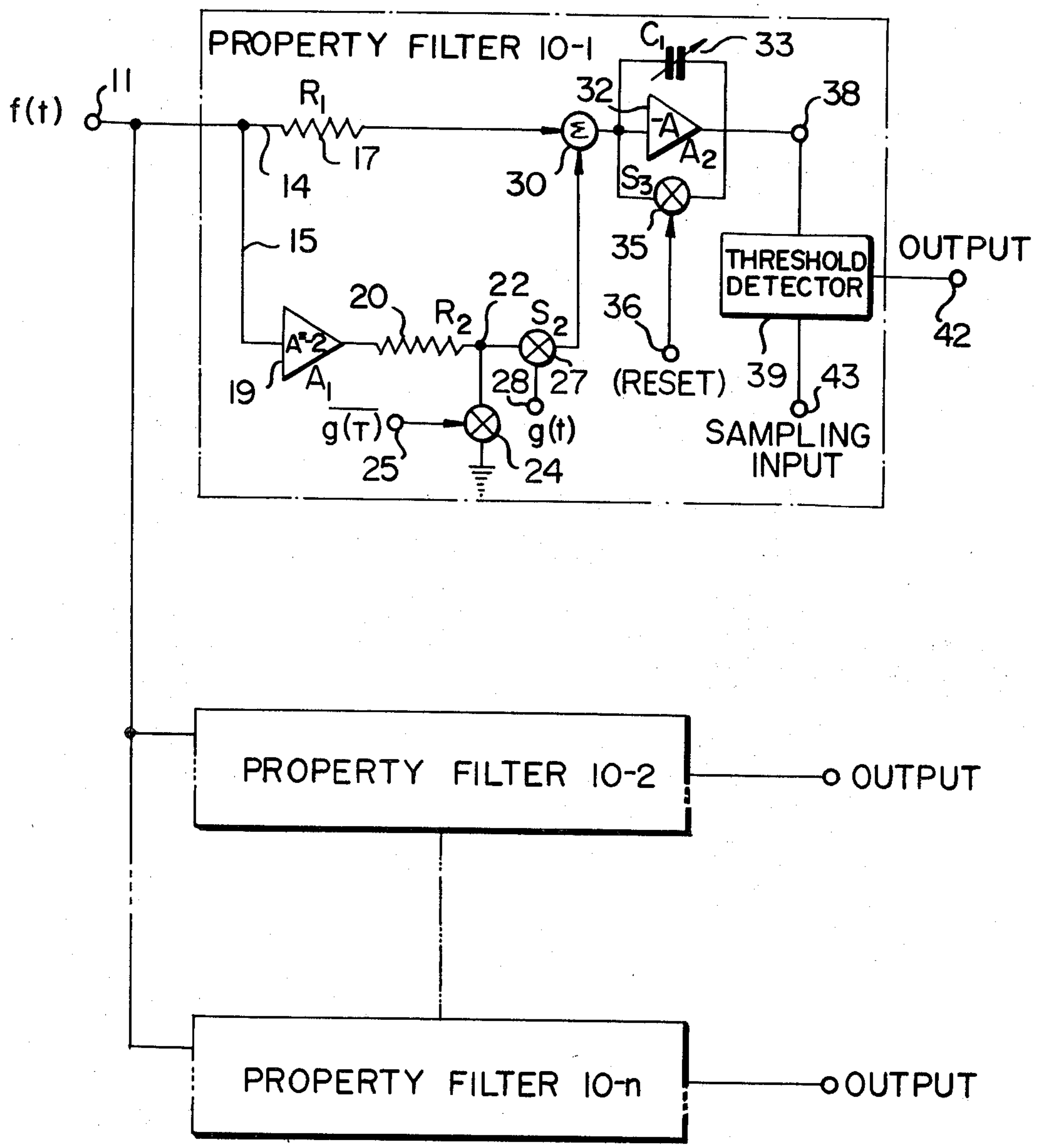
INVENTOR
JAMES H. WORTHEN
BY Hurwitz & Rose
ATTORNEYS

United States Patent Office 3,541,509
Patented Nov. 17, 1970

3,541,509

PROPERTY FILTERS

James H. Worthen, Springfield, Va., assignor to Melpar, Inc., Falls Church, Va., a corporation of Delaware Filed Dec. 28, 1966, Ser. No. 605,377
Int. Cl. G06k 9/06
U.S. Cl. 340—146.3 7 Claims

ABSTRACT OF THE DISCLOSURE

A system for processing an analog signal, which includes two parallel paths for the signal, terminating in a sum circuit, an integrator which sums the output of the sum circuit for a predetermined time, and a device which provides a digital signal of zero or one according to the level achieved by the integrator, one of the two parallel paths including means for multiplying the analog signal by −2 and the result selectively by +1 and −1.

The present invention relates generally to systems for the analysis, identification, or recognition of patterns, such as waveforms, and more particularly to property filters for use in such systems.

Pattern analysis may be defined as the separation of a pattern into its constituent parts or properties. It is apparent that if any two or more patterns differ in the degree to which they possess any one property, then the patterns can be distinguished on the basis of this property. Hence, a pattern can be categorized by a description of its properties, and by defining such properties the class of all distinguishable patterns is also defined. Unless redundancy is desired, it is important in selecting those properties from which a pattern is to be analyzed or synthesized that each property be independent of the others. However, a considerable amount of freedom is generally available in deciding upon the property bases for a given pattern vector space.

In the case of time varying electrical signals, which exemplify patterns that may be analyzed and or synthesized, the selected property or parameter may be the waveshape, frequency, phase, or combinations thereof, for example. Systems for analyzing, identifying or recognizing such signals have been devised in which the analog input under analysis is converted ot an $n$-bit digital output (binary word), referred to as a digital descriptor of the analog signal over a specified interval of time. The sequence of digital descriptors so obtained is then utilized for further analysis of the input signal. An exemplary embodiment of this type of system is disclosed in the copending application for U.S. Letters Patent of Fuhr et al., filed May 4, 1964, designated Ser. No. 364,665, and commonly assigned herewith, now U.S. Pat. No. 3,319,229, issued May 9, 1967.

Briefly, the system described in the Fuhr et al. application is a form of machine intelligence adapted to "read" the input pattern (such as a bandwidth-limited signal), to compare the digital descriptors of that pattern with digital descriptors of patterns which the system has been trained to recognize (by a "learning" technique in which digital descriptors of patterns are stored in a memory unit, such as a core matrix), and to identify the input pattern on the basis of the least logical distance between its digital descriptors and those of the "training patterns." The logical distance, or Hamming distance, between two binary words is defined as the sum of the number of "ones" in the term-by-term EXCLUSIVE OR combination of the two words. For example, the logical distance between the four-bit words 0000 and 0010 is 1, whereas the logical distance between 0000 and 1101 is 3. Hence, recognition is effected by the system by determining which of the previously learned patterns is "nearest" the present input pattern in terms of logical distance between their digital descriptors. A limitation may be placed on the pattern identification process by providing a means for selecting the maximum acceptable distance between the input pattern and a training pattern, so that no recognition is achieved if the input pattern is not sufficiently close to a stored pattern.

In the Fuhr et al. system, the digital descriptors of each input pattern are obtained from a set of $n$ property filters, each filter supplying one bit of a descriptor. In general, the probability that any two randomly selected signals will give rise to identical digital descriptors of $n$ bits (from the set of $n$ property filters) is;

$$P_I=2^{-n} \quad (1)$$

If the total number of binary combinations of filter outputs is much greater than the total number of different inputs, the probability of successful recognition by the system is:

$$P_R=(1-2^{-n})^m \quad (2)$$

where $m$ is the total number of distinctions to be made. If the network is to distinguish $k$ sets of signals having $r$ members in each set, it will be observed that the first set of $r$ signals must be distinguished from the remaining $(k-1)r$, the second set from $(k-2)r$, and so forth, so that the total number of distinctions required is $$m=r^2[(k-1)+(k-2)+ \ . \ . \ . \ +1]=\frac{r^2k(k-1)}{2} \quad (3)$$

Substituting expression (3) into expression (2), and performing partial binomial expansion, the probability of successful recognition becomes $$P_R=1-[2^{-(n+1)}r^2k(k-1)] \quad (4)$$

The size or complexity of the required system may therefore be determined on the basis of probability of successful classification ($P_R$), number of filters ($n$), number of set classifications ($k$), and number of variations within a set ($r$).

It should be emphasized that there is no requirement of advance knowledge of the real properties of the input signal in order to implement the property filters. Each filter, in effect, performs a measurement in the form of a binary experiment on an abstract property of the input signal. Typically, the experiment is performed by production of a binary output $h(t)$ from an input signal $f(t)$ in accordance with a binary gating function $g(t)$. The output at time T is $$h(t)=\int_0^T f(t)g(t)dt \quad (5)$$

A conventional implementation of the property filter to obtain this output comprises a current generator, to which the input signal $f(t)$ is applied and which is gated on or off by a gating function limited to the values +1 and −1, and a current integrator, which integrates the sample of the input signal over the time T, where the interval from $t=0$ to $t=T$ is an integral multiple of the period of $g(t)$. It will be apparent that the output $h(t)$ of the current generator must have a probability of 0.5 of being greater than zero (i.e., equal likelihood of being positive or negative) when $f(t)$ is a randomly selected waveform. Simple threshold detection of $h(t)$ with the threshold value set at zero volts (ground), will result in a binary one output from the property filter for $h(t)>0$ and a binary zero for $h(t)<0$.

A requirement for a set of property filters is that the responses of the filters be mutually independent, i.e., that the output of any one filter of the set have a 0.5 probability of being a binary one without regard to the output of any other filter at time T. This may be realized, for example, by providing a gating function $g_2(t)$ for the second filter of the set which is twice the frequency of $g_1(t)$, the gating function for the first filter of the set, and so forth. To this end, a binary counter may be employed, where the waveform frequency of $g_1(t)=1/T$ is derived from the lowest stage and $g_2(t) \ldots g_n(t)$ are derived from successive stages (frequency being doubled with each successive stage). Other waveform combinations are also feasible, the only requirements being that each waveform have an equal likelihood of producing an output which exceeds the threshold and that the waveforms represent an orthonormal set. The problem in generating orthonormal filter codes (gating functions) from successive stages of a binary counter is that the successive doubling of frequency rapidly reaches a limit in terms of logic speeds, thereby restricting the number of filters that can be employed. Using counter generation, the number of bits ($b$) required as a function of the number of orthonormal filters ($n$) is $$b=2^n \quad (6)$$

One type of group code which minimizes $b$ as a function of $n$ is a MacDonald code (see, e.g., Peterson, Error Correcting Codes, Wiley, 1961, pp. 43 and 77), where the relationship between $b$ and $n$ may be shown to be $$b=2^k, \text{ where } n\leq 2^k-1 \quad (7)$$

and if $n=2^k-1$:

$$b=n+1 \quad (8)$$

In prior art property filters problems have been encountered in several areas. Principal among these is the handling of bipolar signals and the restricted or fixed character of the time period over which integration is performed. In the prior art it has been common to employ two R-C networks for integration, each network being energized alternately according to the gating function $g(6)$. At time T the values of the outputs of the two integrator circuits are then compared to determine the digital output. In addition to this undesirable method of handling bipolar functions, such circuits are complicated by the requirement of two switching nodes. Moreover, an R-C network 11 will integrate an input signal linearly only when the voltage drop across the capacitor is small compared to the voltage drop across the resistor. This is a severe limitation where the property filter is to be subjected to a range of integration periods T and the value of R-C must be varied accordingly.

Accordingly, it is a principal object of the present invention to provide an improved property filter.

It is a more specific object of the invention to provide a property filter having a variable of programmable time period over which a segment of the analog voltage to be analyzed is converted to a digital descriptor thereof.

Another object of the present invention is to provide a property filter for pattern recognition systems wherein the aforementioned time period is variable over a wide range relative to prior art property filters.

Still another object of the invention is to provide a property filter having an integrator with a single ended output characterizing integrating networks required in prior art property filters. A related object is to provide a property filter wherein the detector circuit may be simplified because of the single ended input.

Briefly, the above and other objects are achieved according to the present invention by the provision of a property filter comprising a multiplier network for producing an output representative of the product of the values of the gating function and the analog input signal, the multiplier network including a pair of parallel circuit paths operative to provide an output equal to $f(t)$ or $-f(t)$, and switching means by which the multiplying factor (gating function) $g(t)$ is introduced; an integrator including a DC operational amplifier for performing the integrating function and having a variable capacitor connected between input and output thereof and a programmable switch for resetting the integrator to zero at the end of the desired integration period; and a detector having a single ended input circuit and responsive to the integrator output at time=T to generate one bit of the digital descriptor of the segment of the analog input voltage under analysis. In essence, the property filter is an analog-to-digital converter, differing from conventional converters in that more than one dimension of information is provided concerning the analog input; that is, the property filter can recognize any individual property or combination of properties of the input signal. The filter may be rendered adaptive in a conventional manner by periodically changing the gating function in a manner commesurate with the orthonormal set of filter codes (gating functions) selected. This alters the transfer function of the filter and, in effect, provides a "new" filter with each change.

The above and still further objects, features and attendant advantages of the present invention will become apparent from a consideration of the following detailed description of an exemplary embodiment thereof, especially when taken in conjunction with the accompanying drawing, in which The sole figure is a circuit diagram of a set of property filters for use in a pattern recognition system.

Referring now to the drawing, the analog signal $f(t)$ to be recognized or identified is applied to a set of property filters 10–1, 10–2 . . . **10–*n*. Since each filter is of similar construction, only one, 10–1**, has been shown in detail and a description of that filter will suffice for all.

The filter comprises an input terminal 11, a pair of parallel circuit paths 14, 15, by which the signal is processed to yield the product $g(t)\cdot f(t)$, an integrator 31 including an operational amplifier 32 connected to perform the integrating function of the signal representing the product, and a threshold detector 39 for sensing the output of the integrator at the sample time and generating a binary one if that output is equal to or greater than the threshold value and a binary zero for integrator output less than threshold. The output of the threshold detector is one bit of the digital descriptor generated by the set of $n$ property filters.

Circuit path 14 includes a resistor 17 so that the output of that path is simply a signal proportional to $f(t)$. Circuit path 15 includes an operational amplifier 19 for inverting the polarity of $f(t)$ and amplifying the signal by a factor of two. It should be noted that the output of amplifier 19 may be utilized to supply more than one property filter.

The operational amplifier is followed by a resistor 20 having a value equal to that of resistor 17. Hence, if analog switch 27 connecting resistor 20 to summing node 30 were closed, the output of circuit path 15 would be $-2f(t)$ and the net sum through the two paths 14 and 15 would be $-f(t)$. However, analog switch 27 is driven by the binary gating function $g(t)$ which, as previously explained, is limited to the values $\pm 1$, and a second analog switch 24 is connected from a node 22 between resistor 20 and switch 27 to ground and driven by the inverse gating function $\overline{g(t)}$. The latter function may be obtained from an inverter responsive to $g(t)$, and applied simultaneously with $g(t)$ to the two analog switches via terminals 25 and 28, respectively. Each of the two switches may be a transistor switch circuit conventionally constructed to close when a negative pulse is applied to the respective input terminal and to open when a positive pulse is applied. Hence, when $g(t)$ is $-1$ (and thus $\overline{g(t)}$ is $+1$), analog switch 27 is closed and switch 24 is open. In that event, the output of summing node 30 is proportional to $-f(t)$. If, however, $g(t)$ is $+1$, switch 24 is closed and switch 27 is open and the output at summing node 30 becomes proportional to $+f(t)$ since $f(t)$ has a path via resistor 17. Analog switch 24 is utilized to present a constant load on the output terminals of operational amplifier 19 when switch 27 is opened, thereby eliminating transients that might otherwise occur.

It will readily be observed, then, that the signal applied to integrator 31 is always representative of $f(t) \cdot g(t)$. The integrator comprises a DC operational amplifier 32 having a high negative gain and in parallel circuit with adjustable capacitor 33 and with a third analog switch 35. In operation of the integrator circuit, amplifier 32 performs the integrating function with a time constant of $t$=RC, where R is the value of each of resistances 17 and 20 and C is the value of capacitor 33. The time constant is a function of the time period $\tau$ and $g(t)$.

The period $\tau$ over which the product signal is integrated may be rendered variable (i.e., programmable) by appropriate application of a reset signal to switch 35 via terminal 36. In this manner, the analog switch 35 is energized at the end of an integration period of desired length to reset the integrator to zero in preparation for the next input signal. This integration period may be designated or defined as the span of attention of the filter and would, of course, be identical for all filters in the set, to produce a digital descriptor representing a given segment of the analog input voltage. In addition, the value of variable capacitor 33 may be adjusted for different values of $\tau$.

The signal at node 38 is the integrator output and represents $h(t)$ in expression (5), above where $T=\tau$. The threshold detector 39, responsive to the output of integrator 31 at time=$\tau$ to generate a binary one or binary zero according to the relationship between value of integrator output and the threshold value, may be of any conventional type, such as a Schmitt trigger circuit, followed by a logic AND gate. Preferably, the threshold value is adjusted to produce indeterminant output for zero analog signal input; that is, the threshold level is set at approximately zero volts. The sampling command at input terminal 43 enables the detector at time to sample the integrator output. The detector output remains unaltered when the sample input is off.

The set of $n$ parallel filters thus operate to provide a digital descriptor of $n$ bits at the conclusion of each span of attention. Each digital descriptor may then be further processed in any conventional manner to determine its logical distance from each of a plurality of binary reference words. An indication of "closeness," within a predetermined maximum acceptable distance, to one of the reference words constitutes an identification of the analog signal pattern.

While I have disclosed a preferred embodiment of my invention, it will be apparent to those skilled in the art that variations in the specific details of construction which have been illustrated and described may be resorted to without departing from the spirit and scope of the invention as defined in the appended claims.

I claim:

1. A filter for generating digital data related to properties of an analog signal integrated over periods of time, said filter comprising means responsive to said analog signal and to a preselected binary gating function having values $\pm 1$ for generating only one analog signal representative of the product of said analog signal and said gating function; a single integrating means responsive to the output signal of said product generating means for integrating said output signal over a variable time interval, said single integrating means including means for resetting said single integrating means to a reference value at the conclusion of said time interval; and a single threshold detecting means responsive to the integral produced by said single integrating means for producing a bit of data at the conclusion of said time interval in accordance with whether or not the value of said integral exceeds a predetermined threshold level of said detecting means.

2. The combination according to claim 1 wherein said product generating means comprises a pair of parallel circuit paths; means for applying said analog signal simultaneously to both of said circuit paths; one of said circuit paths producing an output therefrom proportional to the magnitude of, and of identical polarity to, said analog signal; the other of said circuit paths including means for deriving a further signal proportional to the magnitude of said analog signal and of opposite polarity thereto, and switch means responsive to said binary gating function and to the complement thereof for passing or preventing the passage of said further signal as an output signal from said other circuit path depending upon the instantaneous binary value of said gating function; and means for combining the output signals of said pair of parallel circuit paths to produce said product-representative signal.

3. The combination according to claim 2 wherein said one of said circuit paths includes a resistor; and wherein said means for deriving in said other circuit path includes an operational amplifier responsive to said analog signal for inverting the polarity thereof and amplification thereof by a factor of two, and a further resistor connected to receive the output of said amplifier, said further resistor having a resistance value at least substantially identical to that of the first-mentioned resistor.

4. The combination according to claim 3 wherein said switch means comprises a pair of switches, one of said switches responsive to said gating function to open or to close said other circuit path from said further resistor to said combining means, the other of said switches responsive to said complement of said gating function to close or to open a path between the output terminal of said further resistor and a point of reference potential during the intervals when said one of said switches is open or closed, respectively.

5. The combination according to claim 1 wherein said integrating means comprises an operational amplifier having input and output terminals, a variable capacitor connected between said input and output terminals, said capacitor cooperating with the resistive impedance of said product generating means to produce the time constant of integration of said product-representative signal, said time constant thereby being variable in accordance with variation of the capacitance value of said capacitor, and wherein said means for resetting of said integrating means includes switch means connected in parallel circuit with said variable capacitor for short circuiting said capacitor in response to receipt of a reset pulse applied at the desired conclusion of each discrete time interval over which said product-representative signal is to be integrated.

6. Apparatus for producing a digital description of one or more of the properties of an analog input pattern, said apparatus comprising a set of $n$ property filters, means for applying an analog signal representative of said pattern in parallel to each of the filters of said set of filters, each of said filters comprising the combination as specified in claim 1, the binary gating function for each filter being one of a set of orthonormal gating functions applied to said set of filters, whereby the response of each filter is independent of the response of each of the other filters of said set, each filter producing a separate bit of said digital description.

7. An analog signal processing system, comprising a source of analog signal $f(t)$, first and second paths connected in parallel to said source, a summing circuit terminating said paths, said summing circuit having inputs connected to receive signals from said paths and having an output, an integrator means connected to said output for integrating the signal provided by said output over a predetermined time interval to provide an integrated signal, means responsive to said integrated signal for providing a digital signal having the value zero or one according to whether said integrated signal achieves or does not achieve greater than a predetermined level, each of said paths including means for equalizing signals supplied to said summing circuit, and means included in one of said paths only for transforming the signal in that path by multiplication of the analog signal by the factor −2, and for further multiplying said last named analog signal selectively by the function +1 and −1.

References Cited

UNITED STATES PATENTS

| | | | |
|---|---|---|---|
| 3,208,065 | 9/1965 | Gutleber et al. | 235—181 X |
| 3,319,229 | 5/1967 | Fuhr et al. | 340—172.5 |
| 3,328,686 | 6/1967 | Fuchs | 324—77 |
| 3,416,081 | 12/1968 | Gutleber | 324—77 |

MAYNARD R. WILBUR, Primary Examiner

G. R. EDWARDS, Assistant Examiner

U.S. Cl. X.R.

179—1; 324—77; 325—181